United States Patent [19]

Yorke et al.

[11] 3,787,079
[45] Jan. 22, 1974

[54] SEALING CONNECTION FOR CONDUIT COUPLINGS

[75] Inventors: Roy E. Yorke, Granada Hills; Fred A. Greenwald, Burbank, both of Calif.

[73] Assignee: General Connectors Corporation, Burbank, Calif.

[22] Filed: Apr. 13, 1972

[21] Appl. No.: 243,829

[52] U.S. Cl. ................. 285/233, 285/261, 285/369
[51] Int. Cl. ............................................ F16l 21/02
[58] Field of Search .... 285/233, 234, 261, 365, 369

[56] References Cited
UNITED STATES PATENTS

| | | | |
|---|---|---|---|
| 3,695,636 | 10/1972 | Graves | 285/233 X |
| 2,971,781 | 2/1961 | Torres | 285/233 |
| 3,610,654 | 10/1971 | Torres | 285/233 |
| 2,852,282 | 9/1958 | Smisko et al. | 285/365 X |
| 2,778,661 | 1/1957 | Leighton | 285/233 X |
| 3,462,175 | 8/1969 | Johnson | 285/369 X |
| 3,540,758 | 11/1970 | Torres | 285/233 |

*Primary Examiner*—Jacob Shapiro
*Assistant Examiner*—David H. Corbin
*Attorney, Agent, or Firm*—Lyon & Lyon

[57] ABSTRACT

A sealing connection for a pair of conduits wherein each conduit is provided with a radially outwardly directed seal ring receiving channel at its extremity in confronting relation to the other conduit. A cylindrical connector band extends between the seal rings and is confronted by a cylindrical housing, which extends thereover and is joined by a pair of pivotal connections to the two conduits to resist separation but permit limited relative angular movement. An elastomeric ring is disposed between the connector band and overlying housing to minimize angular movement or radial displacement of the connector band relative to the housing, thereby preventing excess clearance between the connector and thus prevent a seal ring against extrusion from its channel.

1 Claim, 4 Drawing Figures

PATENTED JAN 22 1974 3,787,079

SEALING CONNECTION FOR CONDUIT COUPLINGS

BACKGROUND OF THE INVENTION

Reference is made to U.S. Pat. No. 3,540,758. An embodiment of this invention has been used in some passenger airplanes; however, trouble has been encountered in that the seal rings have failed by being forced by pressure through the space existing between a connecting sleeve and a confronting housing. That is, inspection of the coupling disclosed that the ring had in fact been forced, at least in part, from its channel, but the reason why this should occur was not apparent; in fact, it seemed that no reason existed for this failure, yet the evidence existed.

Several changes were tested but none solved the problem until development of the present invention, which on retrospect engineering it was discovered why the original construction failed and why the present invention solved the problem. More specifically, it was determined that failure was due to:

a. tendency of the connecting sleeve to tilt increasing the clearance between a seal ring channel and connector sleeve;

b. the increased clearance started incipient wedging of the seal ring through the clearance space;

c. This force caused the connector sleeve to displace diametrically further increasing the space; and d. still further increased space developed due to the connector sleeve to assume an oval configuration in the annulus engaged by the seal ring.

SUMMARY OF THE INVENTION

The present invention is directed to a conduit coupling joined by a sealing connection having a pair of seal rings, one for each conduit, and a cylindrical connector sleeve, and a mechanical swivel or pivotal connection joining the conduits and including a housing sleeve confronting the connector sleeve; wherein an elastomeric ring is interposed between the housing and connector sleeves to minimize angular movement, transverse displacement, and distortion to an oval cross section of the connector sleeve, and therefor minimizing spreading of the connector sleeve from the seal ring channel to prevent the seal ring from being forced from its channel.

A further object is to provide a means for preventing failure of a seal ring of a coupling which may be added to the coupling with essentially no other change in the construction of the coupling.

DESCRIPTION OF THE FIGURES

FIGS. 1 and 2 illustrate a conventional conduit coupling. The coupling joins a pair of conduits 1, each having a pair of flanges 2 at its end separated by a channel 3. The outboard flange 2 is provided with a ring of perforations 4. Axially inward from each pair of channels 2 each conduit is provided with a spherical journal segment 5.

Figure 1:
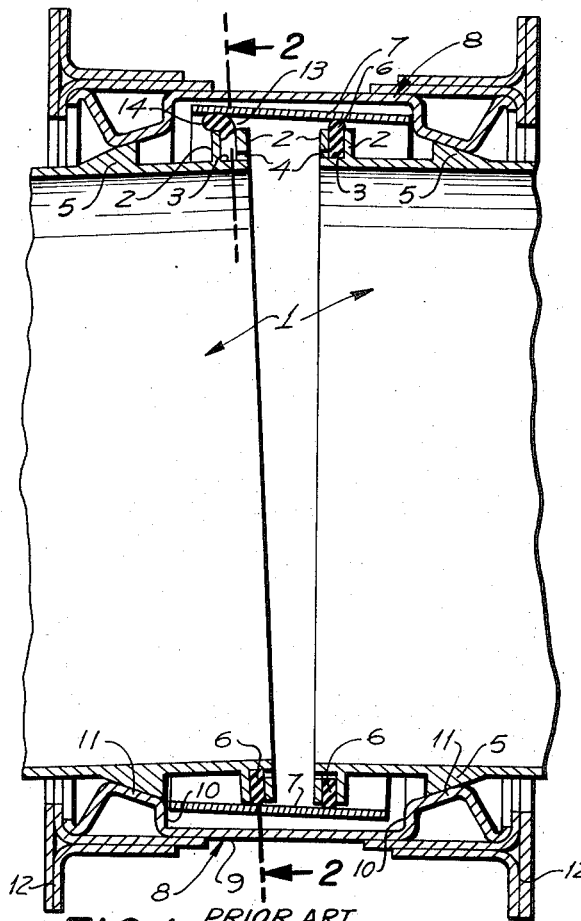
FIG. 1 is a sectional view of a conduit coupling with adjacent ends of confronting conduits shown fragmentarily, the construction representing the prior art.

Each channel 3 is open radially outward and receives a seal ring 6, which may be a solid elastomeric member preferably formed of a silicone elastomer and may contain reinforcing fabric, not shown. Extending axially over the seal rings 6 at a suitable distance beyond the seal rings is a cylindrical sealing sleeve 7, which is engaged by the seal rings 6.

The sealing connection formed by the sealing sleeve 7 and the seal rings 6 is enclosed in a housing 8 comprising a cylindrical portion 9 surrounding the sealing sleeve 7. The cylindrical portion 9 terminates in radially inwardly directed spaced shoulders 10, which confine the sealing sleeve 7, that is, limit the axial movement of the sealing sleeve.

Continuing from the shoulders 10, the housing forms spherical bearing segments 11 which engage the spherical journal segments 5 so that the conduits 1 are capable of limited pivotal movement.

The housing 8 is divided longitudinally into two complementary halves which are suitably joined together by conventional means, which may take the form shown in U.S. Pat. No. 3,540,758 or may involve other connecting means such as split retainer rings 12, the details of which are not shown as their construction may for the purposes of this application be considered as conventional. In fact, the entire construction thus far described may be considered as conventional.

Couplings made in accordance with the above description have been used in conjunction with the ducting systems of commercial aircraft. However, serious difficulty has been encountered due to seal ring failure; that is, a seal ring 6 has on occasion been extruded from or otherwise forced from its channel 3. The reasons for this are not entirely clear; however, it is believed that there are up to four factors which may, cumulatively, account for this failure. More specifically:

1. The sealing sleeve 7 may tilt when the conduits are disposed angularly.

2. There may be a diametrically directed transitional movement of the sealing sleeve causing the sealing sleeve to bear against a flange 2 at one side of the coupling and increase its spacing therefrom at the opposite side of the coupling.

3. If the coupling is also subjected to substantial internal pressure which is applied to the channels 3 through the perforations 4, the ring may wedge or tend to extrude into the enlarged space. This can have the effect of producing an excess and relatively local radial load on the sealing sleeve.

Figure 2:
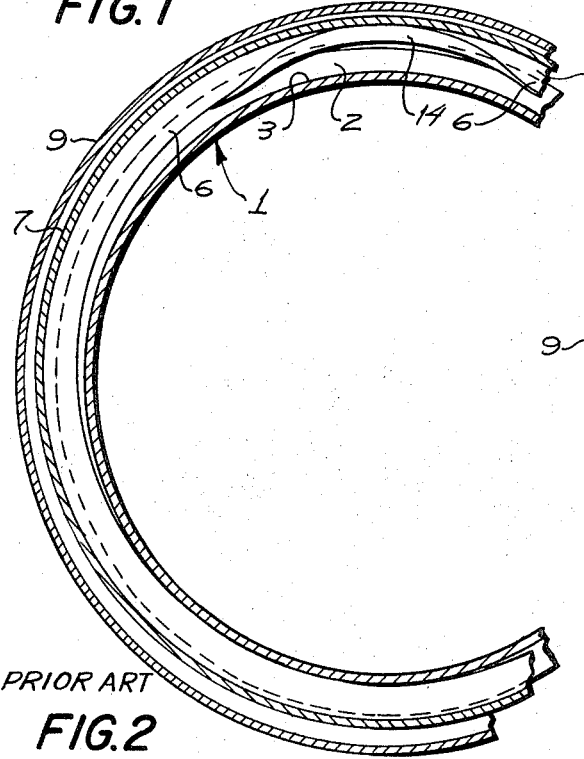
FIG. 2 is a fragmentary transverse sectional view thereof taken through 2—2 of FIG. 1.

4. The wedging action of the seal ring may cause the sealing sleeve to assume a slightly oval shape which further increases the spacing until a point is reached in which the seal ring is forced from its channel causing failure of the coupling. This excessive clearance space is indicated by 13 at the upper left side of FIG. 1 and in the upper portion of FIG. 2, in which is indicated a distorted or extruded seal ring portion 14.

Figure 3:
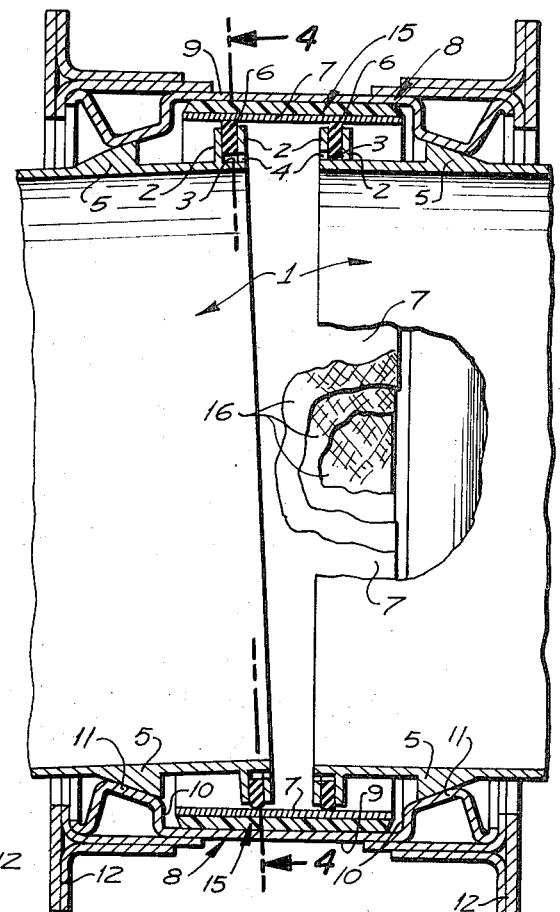
FIG. 3 is a sectional view corresponding to FIG. 1 but showing the improved coupling.
Figure 4:
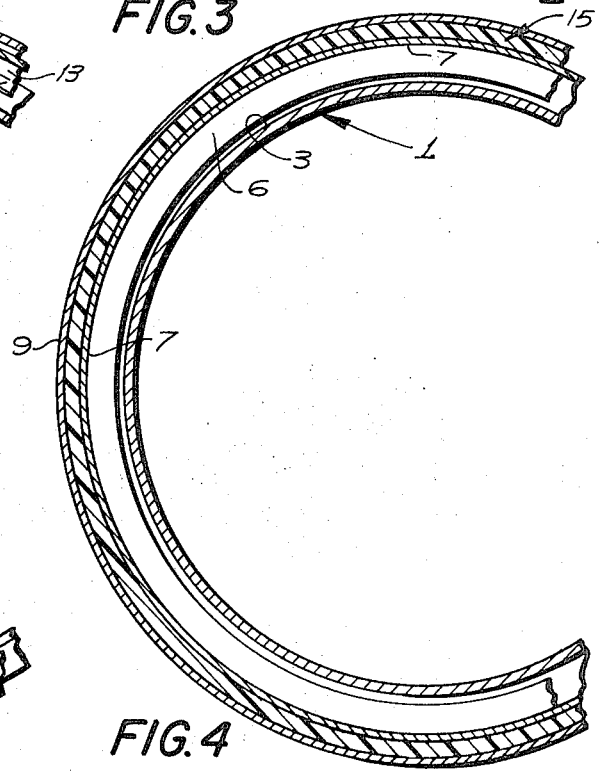
FIG. 4 is a fragmentary sectional view taken through 4—4 of FIG. 3.

Reference is now made to FIGS. 3 and 4. The construction here illustrated is the same as a conventional structure shown in FIGS. 1 and 2 with the additional feature of a spacer band 15 interposed between the sealing sleeve 7 and the cylindrical portion 9 of the housing 8. The spacer band 15 may be bonded to the sealing sleeve 7 or to the cylindrical portion 9. It is preferred, however, for manufacturing purposes to be bonded to the sealing sleeve 7. The spacer band essentially fills the space between the sleeve 7 and cylindrical portion 9 allowing for normal manufacturing tolerances. The spacer band is formed of elastomer impregnated glass fabric reinforcing laminations 16 illustrated in FIG. 3. Each lamination is impregnated and coated with an elastomer, preferably a silicone elastomer capable of being bonded to metal comprising the sleeve 7 or the cylindrical portion 9.

The presence of the spacer band minimizes tilting movement of the sealing sleeve, diametrical translation movement thereof and also minimizes any tendency of the sealing sleeve to assume an oval shape. By minimizing these factors, the spacing between the sealing sleeve 7 and the sealing rings 6 remain at an optimum spacing so that localized displacement of the seal ring 6 from its channel 3 is prevented.

While a particular embodiment of this invention has been shown and described, it is not intended to limit the same to the details of the construction set forth, but instead, the invention embraces such changes, modifications and equivalents of the various parts and their relationships as come within the purview of the appended claims.

We claim:

1. A means for joining a mutually confronting pair of conduits, comprising:

a. a sealing connection including means forming annular radially outwardly open channels at the confronting ends of the conduits, resilient seal rings in the channels and projecting outwardly therefrom and a cylindrical sealing sleeve extending over and engaging the outer surfaces of the seal rings in regions spaced outwardly from the radial outer margins of said channels;

b. a mechanical connection means including a housing sleeve having a cylindrical portion extending over the sealing sleeve in radially spaced relation thereto, and pivotal connecting units joining the end portions of the housing sleeve to each conduit at positions axially spaced from said channels away from said ends and from the axial ends of said sealing sleeve;

c. and a band of a cylindrical reinforced elastomer, the ends of which are axially spaced from said pivotal connecting units, said band essentially filling the space between the sealing sleeve and housing sleeve from substantially end-to-end thereof and tending to maintain the sleeves in concentric parallel relation upon relative angular movements of said conduits about said pivotal connecting units thereby to resist diametrical translation movement and tilting movement of the sealing sleeve with respect to the seal rings, as well as distortion of the sleeve from a cylindrical into an oval shape, thereby to minimize increase in the distance between a radially outer margin of a channel and the confronting portion of its sealing sleeve, and retain the seal ring in its channel.

* * * * *